US011877035B2

(12) United States Patent
Goslin et al.

(10) Patent No.: US 11,877,035 B2
(45) Date of Patent: *Jan. 16, 2024

(54) SYSTEMS AND METHODS FOR CROWD SOURCING MEDIA CONTENT SELECTION

(71) Applicant: Disney Enterprises, Inc., Burbank, CA (US)

(72) Inventors: Michael P. Goslin, Sherman Oaks, CA (US); Skarphedinn Hedinsson, Encino, CA (US); Scott F. Watson, Marina Del Rey, CA (US)

(73) Assignee: Disney Enterprises, Inc., Burbank, CA (US)

( * ) Notice: Subject to any disclaimer, the term of this patent is extended or adjusted under 35 U.S.C. 154(b) by 415 days.

This patent is subject to a terminal disclaimer.

(21) Appl. No.: 16/113,976

(22) Filed: Aug. 27, 2018

(65) Prior Publication Data
US 2018/0367864 A1 Dec. 20, 2018

Related U.S. Application Data

(63) Continuation of application No. 15/019,875, filed on Feb. 9, 2016, now Pat. No. 10,091,559.

(51) Int. Cl.
H04N 21/482 (2011.01)
H04N 21/2665 (2011.01)
H04N 21/442 (2011.01)
H04N 21/25 (2011.01)
H04N 21/466 (2011.01)
H04N 21/258 (2011.01)
H04N 21/45 (2011.01)
(Continued)

(52) U.S. Cl.
CPC .......... *H04N 21/4826* (2013.01); *H04N 7/18* (2013.01); *H04N 21/21805* (2013.01); *H04N 21/252* (2013.01); *H04N 21/25891* (2013.01); *H04N 21/2665* (2013.01); *H04N 21/44004* (2013.01); *H04N 21/44204* (2013.01); *H04N 21/4532* (2013.01); *H04N 21/4667* (2013.01); *H04N 21/4788* (2013.01)

(58) Field of Classification Search
CPC .......... H04N 21/4826; H04N 21/4532; H04N 21/44222; H04N 21/25891; H04N 21/4668; H04N 21/4821; H04N 21/4316
See application file for complete search history.

(56) References Cited

U.S. PATENT DOCUMENTS 6,141,003 A * 10/2000 Chor ................... H04N 5/44543
715/719
8,918,819 B1 * 12/2014 Peters ................ H04N 21/2402
725/139
(Continued)

Primary Examiner — Jason Salce
(74) Attorney, Agent, or Firm — Farjami & Farjami LLP

(57) ABSTRACT

There is provided a system including a memory storing an executable code and a processor executing the executable code to receive a plurality of video inputs, wherein each video input of the plurality of video inputs includes a video feed from an event, provide the plurality of video inputs to each of a plurality of media devices, receive a plurality of user video inputs each from a different one of the plurality of media devices, wherein each of the plurality of user video inputs is created using the plurality of video inputs, and stream each of the plurality of user video inputs as a separate media channel for display by a plurality of media devices.

20 Claims, 4 Drawing Sheets

(51) Int. Cl.
*H04N 21/4788* (2011.01)
*H04N 21/44* (2011.01)
*H04N 21/218* (2011.01)
*H04N 7/18* (2006.01)

(56) References Cited

U.S. PATENT DOCUMENTS

| | | | |
|---|---|---|---|
| 9,301,016 B2* | 3/2016 | Archibong | G06Q 50/01 |
| 2004/0040039 A1* | 2/2004 | Bernier | H04N 5/44543 |
| | | | 725/46 |
| 2005/0262542 A1* | 11/2005 | DeWeese | H04L 12/1818 |
| | | | 725/106 |
| 2006/0228692 A1* | 10/2006 | Seshadri | G09B 5/06 |
| | | | 434/365 |
| 2011/0023076 A1* | 1/2011 | Park | H04N 21/44209 |
| | | | 725/116 |
| 2011/0263946 A1* | 10/2011 | el Kaliouby | G06K 9/00335 |
| | | | 600/300 |
| 2012/0110621 A1* | 5/2012 | Gossweiler, III | G06Q 50/01 |
| | | | 725/46 |
| 2013/0074109 A1* | 3/2013 | Skelton | H04H 20/00 |
| | | | 725/14 |
| 2013/0205358 A1* | 8/2013 | Huang | H04W 88/08 |
| | | | 725/127 |
| 2014/0306865 A1* | 10/2014 | Pan | G06F 3/1423 |
| | | | 345/2.1 |

* cited by examiner

SYSTEMS AND METHODS FOR CROWD SOURCING MEDIA CONTENT SELECTION

The present application is a Continuation of U.S. application Ser. No. 15/019,875, filed Feb. 9, 2016.

BACKGROUND

Today, media broadcast companies provide coverage of media events, such as award shows, sporting events, etc., as a single video stream depicting the media event on a single broadcast channel. A production team, including a producer and an editor, view incoming video feeds from the media event and decide which parts of the event are likely to be popular with most viewers, and select those parts of the media event for broadcast. Although this single-stream model provides coverage that appeals to many viewers, this conventional approach does not provide coverage of the entire media event. Further, hiring production teams to create additional broadcast coverage that caters to the interests of all viewers is too expensive and impractical.

SUMMARY

The present disclosure is directed to systems and methods for crowd sourcing media content selection, substantially as shown in and/or described in connection with at least one of the figures, as set forth more completely in the claims.

DETAILED DESCRIPTION

Figure 1:
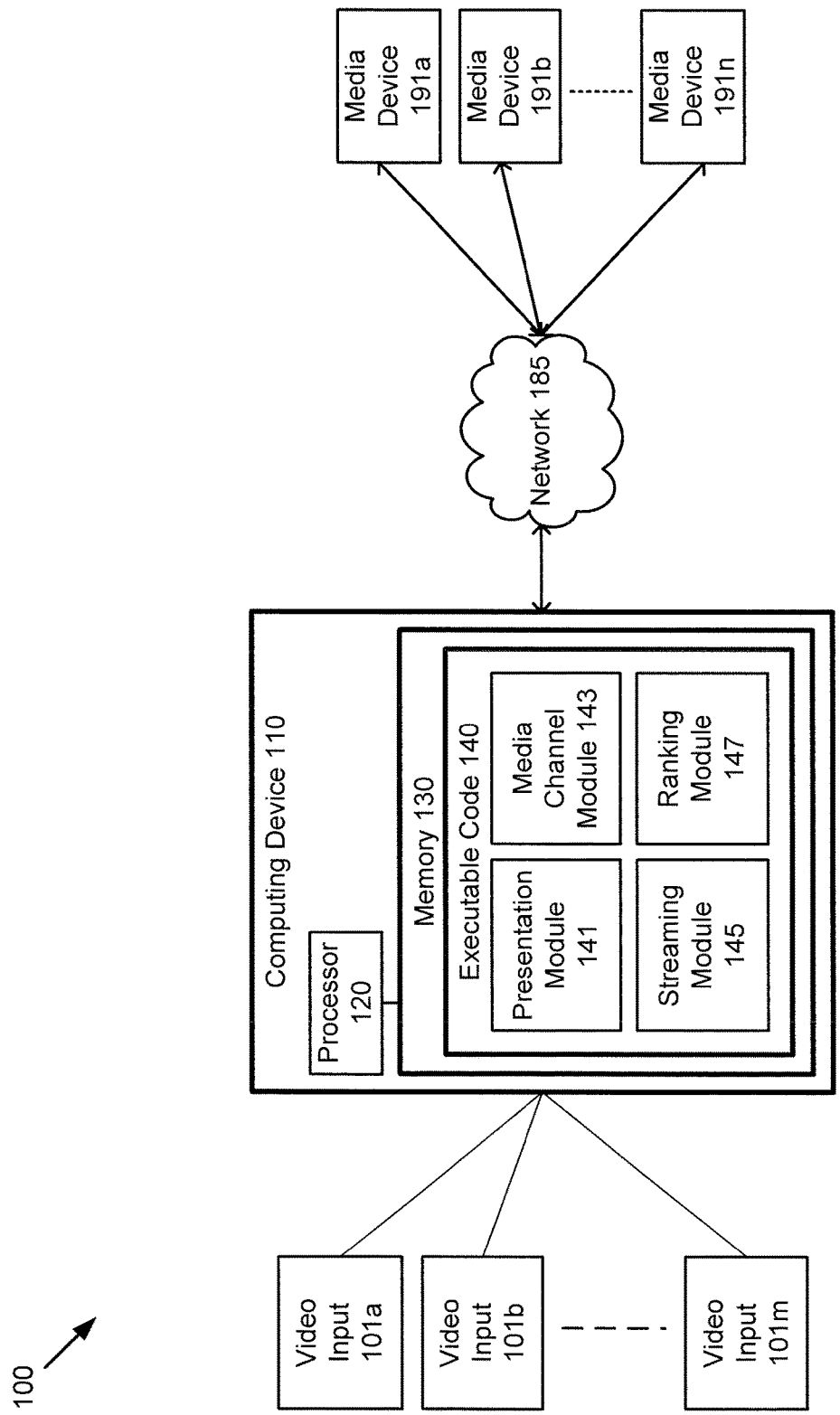
FIG. 1 shows a diagram of an exemplary system for crowd sourcing media content selection, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for crowd sourcing a media content selection, according to one implementation of the present disclosure. System 100 includes a plurality of video inputs 101a, 101b, . . . , 101m, computing device 110, and a plurality of media devices 191a, 191b, . . . , 191n. Computing device 110 includes processor 120 and memory 130. Processor 120 is a hardware processor, such as a central processing unit (CPU) used in computing devices. Memory 130 is a non-transitory storage device for storing computer code for execution by processor 120, and also storing various data and parameters. Memory 130 includes executable code 140. In some implementations, computing device 110 may receive video inputs 101a, 101b, . . . , 101m, provides video inputs 101a, 101b, . . . , 101m to media devices 191a, 191b, . . . , 191n, and streams one or more media channels to media devices 191a, 191b, . . . , 191n. Computing device 110 may be a media server or a third party server.

Video inputs 101a, 101b, . . . , 101m may each include a video feed from an event, such as a movie premier, an award show, a news event, a sporting event, etc., and may include an audio component of the video feed. In some implementations, one or more of video inputs 101a, 101b, . . . , 101m may include video feeds from one or more video cameras at a location other than the location of the event, such as a news room or an entertainment show studio. For example, an event such as an entertainment awards show may include a plurality of video inputs from the location of the award show, such as a theater where the show is taking place, and a plurality of video inputs form a studio, e.g., where hosts give commentary about the awards show. Each video input of video inputs 101a, 101b, . . . , 101m may provide a live video input, a video input that includes content recorded for delayed broadcast, or other media contents. In some implementations, two or more of video inputs 101a, 101b, . . . , 101m may include concurrent live video feeds, such as a first video input including a video feed of the entrance to the theater of an awards show, and a second video input including a video feed of the seating area inside the theater of the awards show.

Executable code 140 includes one or more software modules stored in memory 130 for execution by processor 120 of commuting device 110. Executable code 140 may receive video inputs 101a, 101b, . . . , 101m from a corresponding plurality of video cameras. As shown in FIG. 1, executable code 140 includes presentation module 141, media channel module 143, streaming module 145, and ranking module 147. Presentation module 141 is a software module for execution by processor 120 to provide video inputs 101a, 101b, . . . , 101m to media devices 191a, 191b, . . . , 191n. In some implementations, presentation module 141 may provide the users with all of the video inputs from a media event, including video inputs from different locations at the media event. Presentation module 141 may allow users to select one or more video inputs from video inputs 01a, 101b, . . . , 101m, such as one or more video inputs from the red carpet at an awards show. In some implementations, presentation module 141 may provide video inputs 101a, 101b, . . . , 101m to media device 191a, 191b, . . . , 191n and allow users to select one of video inputs 101a, 101b, . . . , 101m to be streamed as a media channel and control of which video input of video inputs 01a, 101b, . . . , 101m is streamed to viewers of a media channel, where the users may be viewers using their home computers at home over the Internet.

Media channel module 143 is a software module for execution by processor 120 to receive video inputs from media devices 191a, 191b, . . . , 191n created using video inputs 101a, 101b, . . . , 101m. A media channel may be a selection of one or more video feeds chosen by a user to be streamed to one or more of media devices 191a, 191b, . . . , 191n. In some implementations, each media device of media devices 191a, 191b, . . . , 191n may have an associated user account that may be used to create a media channel using the video feeds from video inputs 101a, 101b, . . . , 101m, and/or watch media channels created by users of other media devices of media devices 191a, 191b, ..., 191n. In some implementations, each media channel may be associated with a user account, such as a social network account. Media channel module 143 may receive inputs from one or more of media devices 191a, 191b, ..., 191n creating one or more media channels. Each media channel may include one or more inputs from video inputs 101a, 101b, ..., 101m.

In some implementations, media channel module 143 may receive inputs from one or more of media devices 191a, 191b, ..., 191n to select a video input from video inputs 101a, 101b, ..., 101m. Media channel module 143 may receive input from media device 191a, 191b, ..., 191n including a user annotation of the selected video inputs of video inputs 101a, 101b, ..., 101m. For example, video input 101a may include a video feed showing a celebrity speaking with an entertainment journalist, and a user who has selected video input 101a may enter an annotation or comment including the name of each individual shown in video input 101a and a short statement or commentary of what is depicted by video feed 101a.

Streaming module 145 is a software module for execution by processor 120 to stream a plurality of media channels to media devices 191a, 191b, ..., 191n. In some implementations, streaming module 145 may stream a top ranked media channel to each of media devices 191a, 191b, ..., 191n, or streaming module may stream a user selected media channel to each of media devices 191a, 191b, ..., 191n, where the user of each media device 191a, 191b, ..., 191n may select a different media channel.

Ranking module 147 is a software module for execution by processor 120 to rank the plurality of media channels. In some implementations, the plurality of media channels may be ranked based on one or more of a plurality of criteria. Criteria on which the plurality of media channels may be ranked may include the number of viewers watching each media channel at a given time, an average number of viewers watching each media channel over a time period, such as the last hour or the last day, the number of viewers subscribed to each media channel, the number of comments on each media channel, etc. Ranking module 147 may analyze one or more comments associated with each media channel, where the comments may include notes or comments entered by the user who creates the media channel, and/or comments entered by one or more users viewing the media channel. In some implementations, ranking module 147 may perform a natural language analysis of the one or more comments, and ranking module 147 may include the natural language analysis of the comments associated with each media channel in the ranking of the media channels. Ranking module 147 may award benefits to a user account associated with higher ranking media channels, such as access to improved editing tools, pay or other monetary incentives, etc.

Network 185 may be a computer network, such as the Internet. Computing device 110 may be connected to network 185 via connection 167, and media devices 191a, 191b, ..., 191n may be connected to network 185 via corresponding connections 187a-187n.

Media devices 191a, 191b, ..., 191n may be devices capable of creating, editing, and/or viewing media channels. In some implementations, media devices 191a, 191b, ..., 191n may include a television, a computer, a tablet computer, a mobile phone, etc. Each media device 191a, 191b, ..., 191n may display a main video feed including a media channel, e.g., the highest ranking media channel, a media channel selected by the user, etc. In other implementations, each media device 191a, 191b, ..., 191n may display a streaming media channel and one or more video feeds from video inputs 101a, 101b, ..., 101m.

Figure 2:
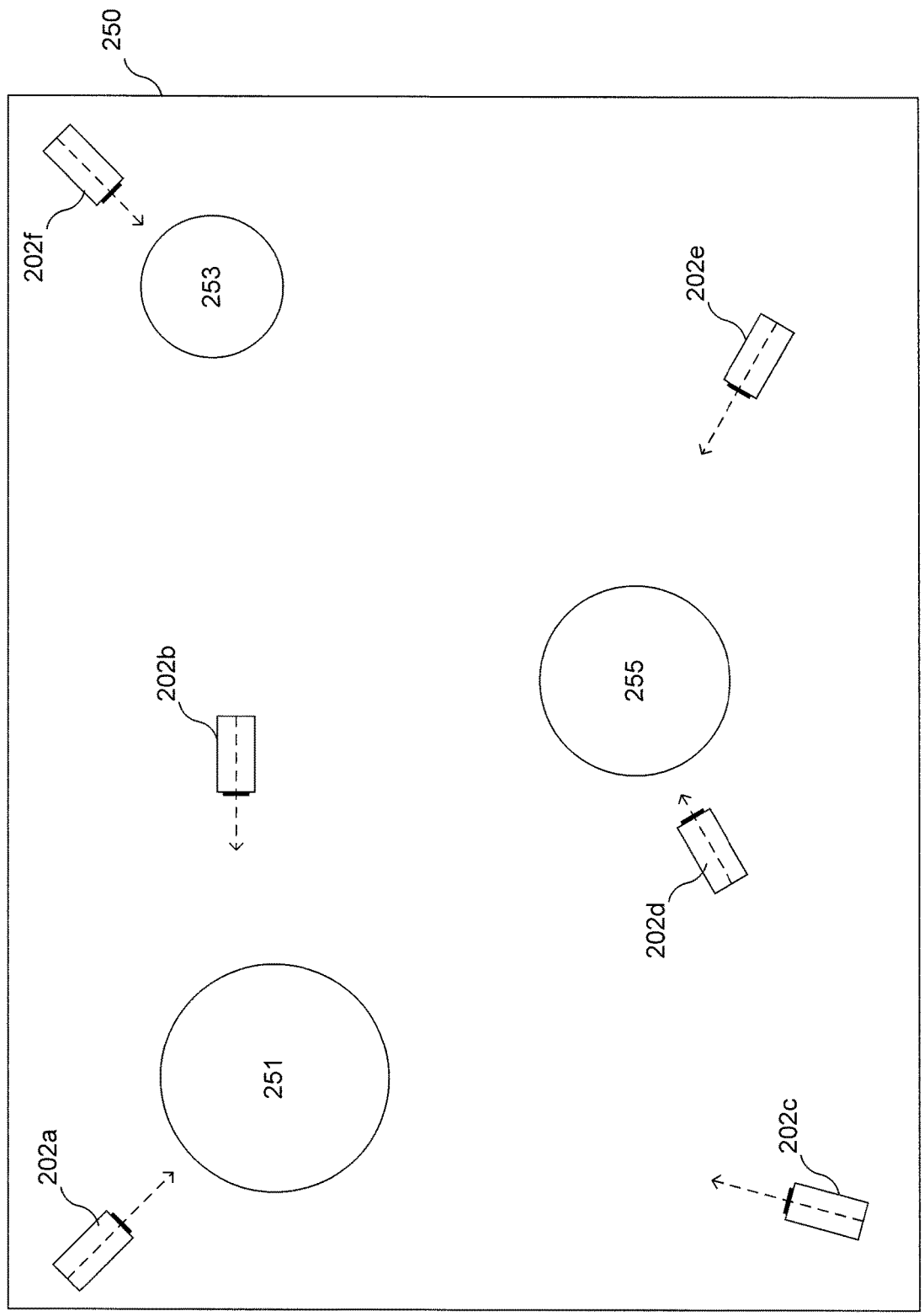
FIG. 2 shows a diagram of an exemplary media environment using the system of FIG. 1, according to one implementation of the present disclosure.

FIG. 2 shows a diagram of an exemplary media environment to implement the system of FIG. 1, according to one implementation of the present disclosure. Diagram 200 includes media event 250, a plurality of video cameras 202a-202f, media interest 251, media interest 253, and media interest 255. Media event 250 may be an event including a plurality of activities in which a user may be interested, such as a conversation involving one or more persons of interest or other activity of interest to the user. For example, media event 250 may be an event such as an awards ceremony. Media interest 253 may be a reporter providing commentary on the event and acting as an anchor in the coverage of the awards ceremony, or may be a specific actor watching the event or speaking with another actor. Media interest 251 may be a focus of attention at media event 250, such as the red carpet, and have video cameras 202a-202c recording what happens on the red carpet. Media interest 255 may be an interview with an actor who just won an award, with video camera 202d recording the reporter and video camera 202e recording the actor. Presentation module 141 may allow a user of one of media devices 191a, 191b, ..., 191n to select a video feed from any camera covering event 250, such as one of cameras 202a-202e, and media channel module 143 may allow the user to include the selected video input 101 in a media channel for streaming to media devices 191a, 191b, ..., 191n. In other implementations, media event 250 may be a sporting event, a live television show, etc.

Figure 3:
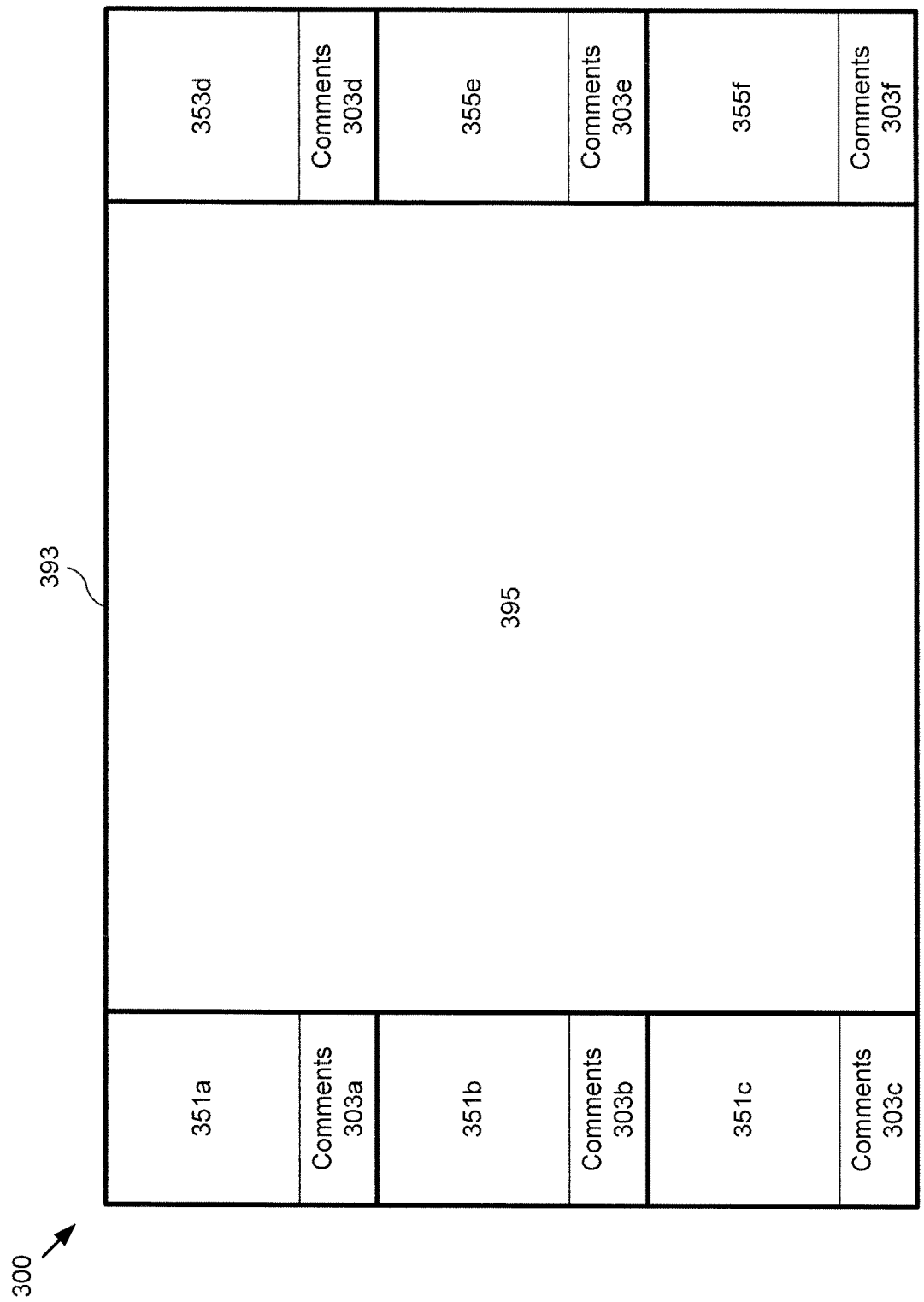
FIG. 3 shows a diagram of an exemplary display including a plurality of video streams and a displayed media channel, according to one implementation of the present disclosure.

FIG. 3 shows a diagram of an exemplary display including a plurality of video feeds from video inputs 101a, 101b, ..., 101m and a displayed media channel, according to one implementation of the present disclosure. Diagram 300 shows video inputs 351a-351c, 353d, 355e, and 355f, and streaming media channel 395. In some implementations, the display of each of video inputs 351a, 351b, 351c, 353d, 355e, and 355f may include a popularity ranking such as a counter that displays the number of viewers currently watching each particular video feed, enabling a user of media device 393 to determine what other users are watching. In other implementations, media channels may be displayed in order of popularity or ranking, such as the most popular or highest ranking media channel being displayed in at a certain position, e.g., in the top left position, and media channels having a lower popularity or ranking being displayed in order following the most popular/highest ranking media channel. Media device 293 may display a media channel in display area 395. In some implementations, display area 395 may display the most popular media channel, a user selected media channel, a user selected video feed from one of video inputs 101a, 101b, ..., 101m, etc. A user may choose to view the most popular and/or highest ranked media channel and a plurality of other video feeds, or the user may choose to view only the most popular/highest ranked media channel. In some implementations, comments 303a, 303b, 303c, 303d, 303e, and 303f may include a media channel creator's editorial comments and/or comments submitted by users viewing the video feed or media channel on one of media devices 191a, 191b, ..., 191n.

Figure 4:
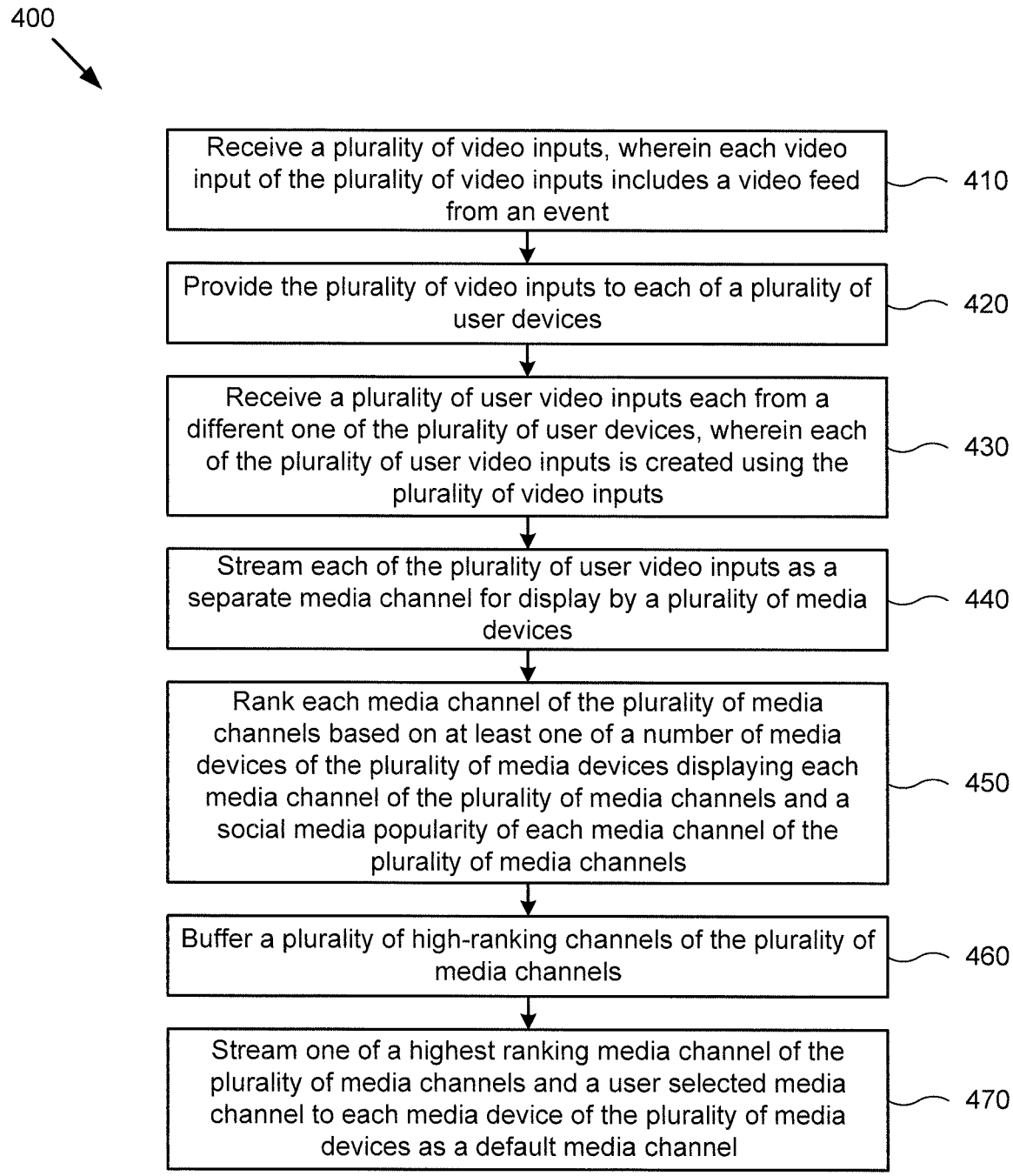
FIG. 4 shows a flowchart illustrating an exemplary method of crowd sourcing content selection, according to one implementation of the present disclosure.

FIG. 4 shows a flowchart illustrating an exemplary method of crowd sourcing content selection, according to one implementation of the present disclosure. Method 400 begins at 410, where executable code 140 receives video inputs 101a, 101b, 101m, wherein each video input of the plurality of video inputs includes a video feed from an event.

Executable code 140 may receive the plurality of video inputs 101a, 101b, . . . , 101m from a corresponding plurality of video cameras, such as one or more video cameras located at the event, and/or one or more video cameras in a studio recording coverage of the event. For example, the event may be a Hollywood awards show hosted at a theater. Video inputs 101a, 101b, . . . , 101m may include a plurality of video cameras located at the theater, such as one or more recording the arrival of attendees, one or more video cameras recording the red carpet entrance of the theater, one or more video cameras recording the seating area inside the theater, and one or more cameras at a studio recording one or more anchors for the coverage of the award show.

At 420, executable code 140 provides video inputs 101a, 101b, . . . , 101m to each media device of media devices 191a, 191b, . . . , 191n. In some implementations, executable code, using presentation module 141, may enable the user to view one or more media channels while viewing one or more of video inputs 101a, 101b, . . . , 101m at the same time. For example, media device 191a may have a display showing a streaming media channel, such as the most popular media channel or a media channel selected by the user, and display one or more of video inputs 101a, 101b, . . . , 101m. A user of media device 191a may create a media channel by selecting one of video inputs 101a, 101b, 101m to stream, and may change the selected video input at any time. The ability to choose which video input of video inputs 101a, 101b, . . . , 101m is streamed allows a user watching the media channel on a second media device, e.g., media device 191b, while concurrently viewing other media channels and video inputs to select a media channel or one of video inputs 101a, 101b, . . . , 101m including the content that most interests the second user. In some implementations, a user may choose to view one or more streaming media channels, one or more video feeds from video inputs 101a, 101b, . . . , 101m, or a combination of streaming media channels and video feeds from video inputs 101a, 101b, . . . , 101m using one of media devices 191a, 191b, . . . , 191n.

At 430, executable code 140 receives a plurality of user video inputs each from a different one of media devices 191a, 191b, . . . , 191n, wherein each of the plurality of user video inputs is created using the plurality of video inputs. Each user video input may include one or more of video feeds 101a, 101b, . . . , 101m. A user of a media device of 191a, 191b, . . . , 191n, e.g., media device 191a, may select a video input from video inputs 101a, 101b, . . . , 101m. In some implementations, the user of media device 191a may continue streaming the selected video input for a time, such as a few seconds, a few minutes, etc. The user of media device 191a may continue to watch other video inputs 101a, 101b, . . . , 101m, and when the user of media device 191a sees another media event or occurrence, the user may choose to begin watching the video input showing the other event or occurrence, e.g., an interview with an actor, the announcing of a certain award, etc.

At 440, executable code 140 streams each of the plurality of user video inputs as a separate media channel for display by media devices 191a, 191b, . . . , 191n. In some implementations, streaming module 145 may stream a plurality of media channels to media devices 191a, 191b, . . . , 191n. Each media device 191a, 191b, . . . , 191n may include a display capable of showing the media content of each media channel. Each media device 191a, 191b, . . . , 191n may include speakers capable of playing an audio content of each media channel. In some implementations, media devices 191a, 191b, 191n may allow a user to select one or more of video inputs 101a, 101b, . . . , 101m to be included as media content of a media channel. Media devices 191a, 191b, . . . , 191n may allow users to watch one or more media channels created by other users. In some implementations, executable code 140 may allow a user to continue watching a video feed from one of video inputs 101a, 101b, . . . , 101m when a streaming media channel changes to another video input. In some implementations, streaming module 145 may stream a default media channel to each media device 191a, 191b, . . . , 191n. A default media channel may be a media channel that is streamed to a media device, such as media device 191a, until a user of media device 191a selects another video input 101a, 101b, 101m, or another media channel to be displayed on media device 191a.

At 450, executable code 140, using ranking module 147, ranks each media channel of the plurality of media channels. In some implementations, ranking module 147 may rank the plurality of media channels based on at least one of a number of media devices of the plurality of media devices displaying each media channel of the plurality of media channels and a social media popularity of each media channel of the plurality of media channels. In some implementations, executable code 140 may communicate with each media device 191a, 191b, . . . , 191n to determine which video inputs of video inputs 101a, 101b, . . . , 101m and which media channels are being displayed. Ranking module 147 may access and analyze comments left by users associated with each video input and each media channel.

Users may provide feedback about a media channel, such as by indicating the user likes the channel, or by giving the channel a star rating, such as four (4) out of five (5) stars. In some implementations, the aggregate number of "likes" a media channel receives, or the average star rating the media channel receives, may provide a ranking of the media channel. For example, ranking module 147 may determine the rank of a media channel by comparing the number of "likes" or average star rating of the media channel with the same metrics of other media channels. Based on the ranking of the plurality of media channels, ranking module 147 may determine a highest ranked media channel. In some implementations, the highest ranked media channel may also be the most popular media channel. However, the most popular media channel may, at times, be the media channel being viewed by the greatest number of media devices among media devices 191a, 191b, . . . , 191n.

At 460, executable code 140 buffers a plurality of high-ranking channels of the plurality of media channels. In streaming audio or video over the Internet, buffering may refer to downloading a certain amount of data before starting to play media contents of the video input. Having an advance supply of audio samples or video frames in memory at all times may prevent disruptions if there are momentary delays in transmission while the video input is being played. In some implementations, one or more media devices of media devices 191a, 191b, . . . , 191n may buffer one or more media channels, such as a second highest ranked media channel, a user's favorite media channel, a media channel to which a user has subscribed, etc. Method 400 continues at 470, executable code 140, using streaming module 145, streams a default media channel to media devices 191a, 191b, . . . , 191n. In some implementations, the default media channel may be one of a highest ranking media channel of the plurality of media channels and a user selected media channel to each media device of the plurality of media devices as a default media channel.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a non-transitory memory storing an executable code;
a hardware processor configured to execute the executable code to:
receive a plurality of video feeds from a same event;
provide the plurality of video feeds to each of a plurality of media devices including a first media device;
receive a plurality of user video inputs including a first user video input, each of the plurality of user video inputs being received from a different one of the plurality of media devices, and each of the plurality of user video inputs including one or more of the plurality of video feeds, wherein the first user video input is received from the first media device;
stream to the plurality of media devices including the first media device, over a network, each of the plurality of user video inputs as a separate one of a plurality of media channels;
rank the plurality of media channels to determine a first ranked media channel; and
display the first ranked media channel.

2. The system of claim 1, wherein the plurality of media channels are ranked based on a number of media devices of the plurality of media devices displaying each media channel of the plurality of media channels, a social media popularity of each of the plurality of media channels, or a rating input for each of the plurality of media channels received from the plurality of media devices.

3. The system of claim 2, wherein the social media popularity is based on a trending topic on at least one social media site.

4. The system of claim 1, wherein the hardware processor is further configured to execute the executable code to:
receive a plurality of viewer comments related to the plurality of media channels being streamed, and
wherein ranking of the plurality of media channels includes a natural language analysis of the received plurality of viewer comments for each media channel of the plurality of media channels.

5. The system of claim 1, wherein the hardware processor is further configured to execute the executable code to:
buffer one or more of the plurality of media channels not being displayed.

6. The system of claim 1, wherein the hardware processor is further configured to execute the executable code to:
receive a media channel subscription request to subscribe a user account associated with a media device of the plurality of media devices;
in response to receiving the media channel subscription request, subscribe the user account associated with the media device to a media channel.

7. The system of claim 1, wherein
the same event occurs within a venue,
a first video feed of the plurality of video feeds depicts a first location within the venue, and
a second video feed of the plurality of video feeds depicts a second location outside of the venue.

8. The system of claim 1, wherein a first video feed of the plurality of video feeds depicts a first person, and a second video feed of the plurality of video feeds depicts a second person.

9. The system of claim 1, wherein the hardware processor is further configured to execute the executable code to:
display a second media channel of the plurality of media channels, and
wherein the first ranked media channel and the second media channel are concurrently displayed.

10. The system of claim 9, wherein the hardware processor is further configured to execute the executable code to:
receive a plurality of viewer comments related to the plurality of media channels being streamed; and
display one or more of the plurality of viewer comments concurrently with the first ranked media channel and the second media channel.

11. A method for use by a system including a hardware processor, the method comprising:
receiving, using the hardware processor, a plurality of video feeds from a same event;
providing, using the hardware processor, the plurality of video feeds to each of a plurality of media devices including a first media device;
receiving, using the hardware processor, a plurality of user video inputs including a first user video input, each of the plurality of user video inputs being received from a different one of the plurality of media devices, and each of the plurality of user video inputs including one or more of the plurality of video feeds, wherein the first user video input is received from the first media device;
streaming to the plurality of media devices including the first media device, over a network using the hardware processor, each of the plurality of user video inputs as a separate one of a plurality of media channels;
ranking, using the hardware processor, the plurality of media channels to determine a first ranked media channel; and
displaying, using the hardware processor, the first ranked media channel.

12. The method of claim 11, wherein the plurality of media channels are ranked based on a number of media devices of the plurality of media devices displaying each media channel of the plurality of media channels, a social media popularity of each of the plurality of media channels, or a rating input for each of the plurality of media channels received from the plurality of media devices.

13. The method of claim 12, wherein the social media popularity is based on a trending topic on at least one social media site.

14. The method of claim 11, further comprising:
receiving, using the hardware processor, a plurality of viewer comments related to the plurality of media channels being streamed,
wherein ranking of the plurality of media channels includes a natural language analysis of the received plurality of viewer comments for each media channel of the plurality of media channels.

15. The method of claim 11 further comprising:
buffering one or more of the plurality of media channels not being displayed.

16. The method of claim 11 further comprising:
receiving a media channel subscription request to subscribe a user account associated with a media device of the plurality of media devices;
in response to receiving the media channel subscription request, subscribing the user account associated with the media device to a media channel of the plurality of media channels.

17. The method of claim 11 further comprising:
displaying a second media channel of the plurality of media channels, and
wherein the first ranked media channel and the second media channel are concurrently displayed.

18. The method of claim 17 further comprising:
receiving a plurality of viewer comments related to the plurality of media channels being streamed; and
displaying one or more of the plurality of viewer comments concurrently with the first ranked media channel and the second media channel.

19. The system of claim 1, wherein at least one video feed of the plurality of video feeds includes commentary on the same event or an interview related to the same event.

20. The method of claim 11, wherein at least one video feed of the plurality of video feeds includes commentary on the same event or an interview related to the same event.

* * * * *